United States Patent
Halim et al.

(10) Patent No.: US 9,459,933 B1
(45) Date of Patent: Oct. 4, 2016

(54) CONTENTION AND SELECTION OF CONTROLLING WORK COORDINATOR IN A DISTRIBUTED COMPUTING ENVIRONMENT

(71) Applicant: Amazon Technologies, Inc., Seattle, WA (US)

(72) Inventors: AndyGibb Halim, Redmond, WA (US); Swapneel Patil, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/619,834

(22) Filed: Feb. 11, 2015

Related U.S. Application Data

(60) Provisional application No. 62/110,456, filed on Jan. 30, 2015.

(51) Int. Cl.
*G06F 9/52* (2006.01)
*G06F 9/46* (2006.01)
*G06F 9/48* (2006.01)
*G06F 9/50* (2006.01)

(52) U.S. Cl.
CPC . *G06F 9/52* (2013.01); *G06F 9/46* (2013.01); *G06F 9/48* (2013.01); *G06F 9/50* (2013.01)

(58) Field of Classification Search
None
See application file for complete search history.

(56) References Cited

U.S. PATENT DOCUMENTS

| | | | | |
|---|---|---|---|---|
| 6,041,384 A * | 3/2000 | Waddington et al. | G06F 9/524 | 710/107 |
| 6,438,553 B1 * | 8/2002 | Yamada | G06F 9/505 | |
| 7,263,183 B1 * | 8/2007 | Klein et al. | H04M 3/42374 | 379/265.09 |
| 7,454,659 B1 * | 11/2008 | Gaudette et al. | G06F 11/3664 | 714/33 |
| 7,805,412 B1 * | 9/2010 | Gibson et al. | G06F 11/1662 | 707/690 |
| 7,987,152 B1 * | 7/2011 | Gadir | G06F 17/30566 | 707/602 |
| 7,996,511 B1 * | 8/2011 | Wiese et al. | G06F 9/5072 | 709/223 |
| 8,726,278 B1 * | 5/2014 | Shawver et al. | G06F 9/5072 | 718/100 |
| 8,819,335 B1 * | 8/2014 | Salessi et al. | G06F 12/0246 | 711/103 |
| 8,826,284 B1 * | 9/2014 | Fuller | G06F 9/5088 | 718/100 |
| 2002/0016863 A1 * | 2/2002 | Lurndal | G06F 9/4843 | 719/310 |
| 2005/0005200 A1 * | 1/2005 | Matena et al. | G06F 9/5072 | 714/38.13 |
| 2005/0183087 A1 * | 8/2005 | Kubota | G06F 9/5044 | 718/100 |
| 2007/0124363 A1 * | 5/2007 | Lurie et al. | G06F 9/5072 | 709/202 |
| 2008/0059555 A1 * | 3/2008 | Archer et al. | G06F 9/5027 | 709/201 |
| 2008/0114827 A1 * | 5/2008 | Gerber et al. | H04L 12/24 | 709/201 |
| 2009/0320027 A1 * | 12/2009 | Ringseth et al. | G06F 9/4881 | 718/102 |
| 2013/0036423 A1 * | 2/2013 | Mccready et al. | G06F 9/4881 | 718/103 |
| 2014/0298346 A1 * | 10/2014 | Zakashansky et al. | G06F 9/5033 | 718/104 |
| 2016/0050123 A1 * | 2/2016 | Nishanov et al. | H04L 41/5003 | 709/223 |

* cited by examiner

*Primary Examiner* — Benjamin Wu
(74) *Attorney, Agent, or Firm* — Davis Wright Tremaine LLP

(57) ABSTRACT

A distributed work processing system for processing computational tasks IS scalable and fault-tolerant without requiring centralized control. Worker processes running on worker hosts and worker coordinators running on worker coordinator hosts interact with a task store that holds a collection of tasks to be performed by a logical group of worker processes, a lock database used for locking the logical group for coordination by one worker coordinator process at a time, a membership store that contains mappings of worker processes to logical groups, and an assignment store indicating which tasks are assigned to which workers. The worker coordinator process has a scanner process to deal with unassigned tasks and deduplicating duplicate assignments. If a worker coordinator does not see enough worker processes, it can instantiate more. If a worker process does not see a worker coordinator, it can instantiate one.

20 Claims, 9 Drawing Sheets

CONTENTION AND SELECTION OF CONTROLLING WORK COORDINATOR IN A DISTRIBUTED COMPUTING ENVIRONMENT

BACKGROUND

With distributed computing, a computational project can be parsed into tasks and those tasks can be done in parallel and/or can be done with the amount of resources allocated to the project expanding and contracting as needed. This is useful in various fields, including cloud computing and other fields where computation is pushed out to a shared and varying set of resources. In such distributed computing environments, fault-tolerance and scalability are important.

BRIEF DESCRIPTION OF THE DRAWINGS

Various embodiments in accordance with the present disclosure will be described with reference to the drawings, in which.

DETAILED DESCRIPTION

Figure 1:
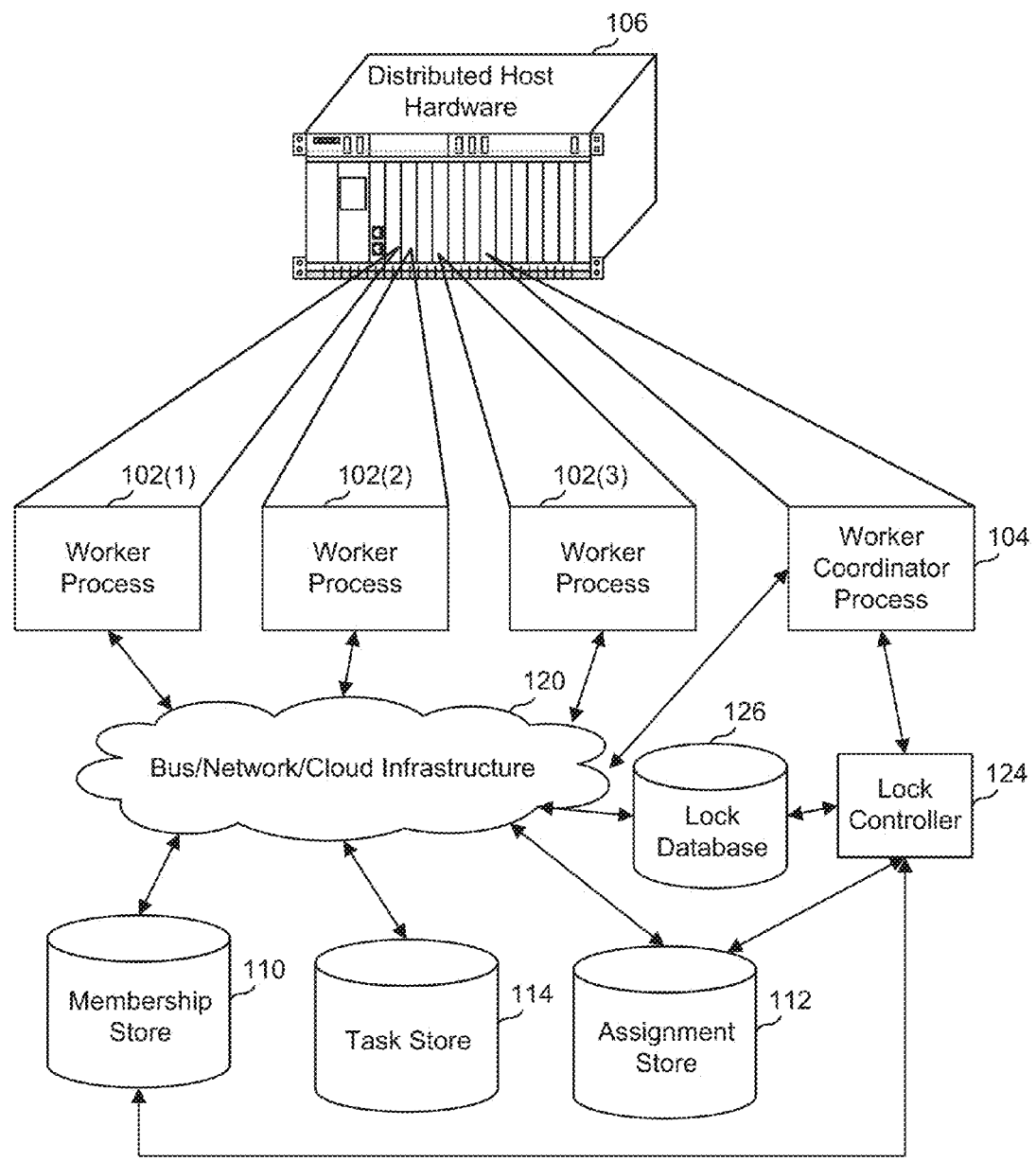
FIG. 1 illustrates an example distributed work processing system.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein provide a system for self-organization among a number of hosts in a distributed computing system to maintain membership in a group and play the roles of a task coordinator and worker in a fault-tolerant way. In part, through the use of strongly-consistent data stores, worker coordinator hosts might fail and worker hosts might fail, but the distributed work will be performed correctly and consistently. The distributed computing system is also scalable.

Fault-tolerance can be important in a distributed computing environment, as resources might come and go, be connected and get disconnected, and/or fail while other resources become available. If a computational project such as generating a data set, performing a large number of computations, generating communications, or other computational projects, has to run from start to finish and any interruptions, however momentary, cause the computational project to have to start back at the beginning, or make things worse by corrupting data or the like, that project should run in a fault-tolerant environment so that the computational project can move forward even when encountering problems along the way.

Scalability is also important in a distributed computing environment. A distributed computing environment is scalable when it can accommodate rising and falling demands properly so that a computing environment does not have to be built to handle the greatest load at times and be idle at other times or be occupied handling a certain load and fail when there are peaks in load demand.

The distributed computing system comprises systems designated as worker coordinators and systems designated as workers. A worker coordinator is a system that manages the membership list of a number of workers and decides on the assignment of tasks for those workers. A worker is a system that is assigned tasks and completes those tasks, which can be computational tasks, communications tasks, or other tasks performed by a distributed computing system. Each system might be embodied in software executing on a computer host.

A worker coordinator is executed by a worker coordinator host and a worker is executed by a worker host. For scalability, workers can be spread over a number of hosts. For fault-tolerance, there are worker coordinators running on at least two distinct worker coordinator hosts, but only one worker coordinator at a time need be the controlling worker coordinator. Workers are associated with a logical group and a worker coordinator is associated with a logical group and multiple logical groups are possible. Thus, a logical group comprises one controlling worker coordinator, possibly some backup worker coordinators, and a plurality of workers. Each of these might be executed on separate hosts, but there also could be multiple of these running on a host. The worker processes and the worker coordinator processes might be implemented as program code that includes instructions to perform various functions of those processes.

The worker coordinator determines which workers work on which tasks, ensuring that there are no tasks being unattended or being over-attended. This ensuring need not be absolute, but a soft assurance that tasks are not being unattended or over-attended might be sufficient. For example, it might be acceptable to the design of a distributed work system that a small number of tasks are performed by more than one worker where only one worker is needed or that some tasks might be momentarily unattended. The parameters of what constitutes sufficient assurance might be coded into the distributed work system or set by parameters. For example, a distributed work system might be considered fault-tolerant if fewer than 1 of 100 tasks are duplicated and all tasks are assured to be worked on within ten minutes of the task being assigned to the distributed work system.

The initial set of workers can be instantiated based on a number of methods, such as static configuration, dynamic configuration, self-organization, heuristics configuration, or a combination of one or more of these. The worker coordinator can be instantiated based on a number of methods, such as static configuration, dynamic configuration, self-organization, heuristics configuration, or a combination of one or more of these, or the worker coordinators might be instantiated by a worker that determines that a worker coordinator is needed for a logical group that worker is a member of.

The worker coordinator determines whether additional workers are needed and can handle failures of parts of the distributed work system. Initially, there might be one or more logical groups of workers that are managed by worker coordinator for that logical group. The groups need not be hard-coded, but could be.

The collection of tasks to be performed by a logical group of workers can be represented in a strongly-consistent data store, a task store, or might be represented by a static configuration, or other approach. The logical group of workers can be represented by entries in a strongly-consistent data store, a membership store.

For each logical group, there are at least two worker coordinator hosts that are independent and being instantiated with worker coordinator processes, to provide fault-tolerance. Each of these hosts will perform a lock acquisition process in an attempt to acquire a lock intrinsic to that particular worker coordinator and for which it can only be held by one host. The lock can be a record stored in a strongly-consistent data store with a key that is tied to the group that the worker coordinator is managing. There are a number of schemes that can be used, such as a globally-unique identifier ("GUID") scheme, or the use of some identifier prefixed by some namespace. Each worker coordinator will periodically check the state of the lock for that worker coordinator's logical group. If the worker coordinator holds the lock, it might update it, otherwise it might direct its host to attempt to acquire it. The independent hosts are independent in that when one stops operating, the other does not necessarily stop operating.

The controlling worker coordinator for the logical group will then assign tasks to the list of workers. The worker hosts periodically check the assignment store and will correspondingly perform a task upon detecting that has been assigned. The assignment store serves as an assignment record and lets the worker coordinator know which workers are working on which tasks.

FIG. 1 illustrates an example distributed work processing system. A number of worker processes 102 are executed by worker hosts and a worker coordinator process 104 is executed by a worker coordinator host. These hosts might be part of distributed host hardware 106, as might be supplied by a cloud computing provider. As shown, the distributed work processing system maintains several data stores, which can be strongly-consistent data stores. These include a membership store 110, an assignment store 112, and a task store 114. Also shown in FIG. 1 is an infrastructure 120 that handles communication including communication between the processes and the stores, a lock controller 124, and a lock database 126. The data stores are strongly-consistent and can go offline and come back online without the entire distributed work processing system necessarily needing to be reset. The worker processes can fail and be replaced without causing total failure and the worker controller can fail and be replaced without causing total failure. Infrastructure 120 might be provided by network-based API calls to web-enabled services, a cloud service API, a bus, or other means for communicating between elements in a distributed system. Although only one worker coordinator process is shown in FIG. 1, it should be understood that there can be multiple worker coordinator proesses, at least one per logical group represented in membership store 110.

If a worker process stops, because a worker host fails, stops the process, or for other reasons, not all of the work already done by the distributed work processing system would be lost. The worker coordinator process will make a note that a task being performed by the worker process is not getting done and can reassign that task. The worker process periodically checks if a worker coordinator process is present and if not, triggers instantiation of a worker coordinator process.

Membership store 110, assignment store 112, and task store 114 might be stores all within one data repository, database management system, or other type of data store. In some variations, assignments for multiple logical groups can be found in one assignment store and tasks for multiple logical groups can be found in one task store. Membership store 110 might also deal with multiple logical groups. The groups are logical groups in that they do not need to be hard-coded into the distributed work processing system.

Figure 2:
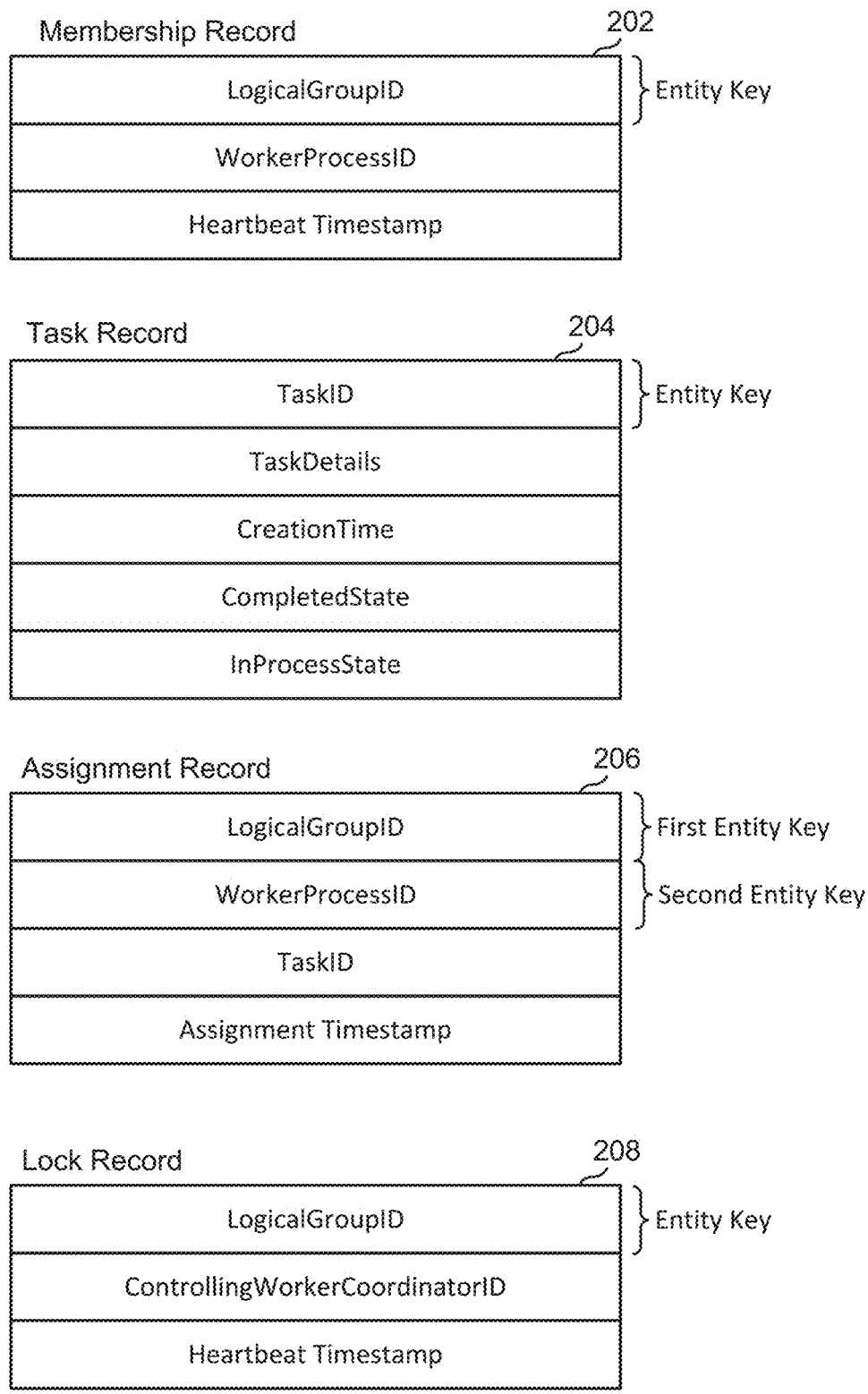
FIG. 2 illustrates examples of data structures that might be used in the data stores of FIG. 1.

FIG. 2 illustrates examples of data structures that might be used in the data stores of FIG. 1. Membership store 110 contains membership records such as a membership record 202 shown in FIG. 2. As illustrated there, membership record 202 has fields for LogicalGroupID, WorkerProcessID, and a heartbeat timestamp. In some data structures, the fields might be referred to as attributes. LogicalGroupID identifies the logical group that a worker is grouped into and that field is the entity key for the membership records. Since it is the entity key, a query on that field can retrieve a list of all of the workers that are part of a logical group. WorkerProcessID uniquely identifies an instance of a worker process executing on a worker host, or that was executing on a worker host. The LogicalGroupID field might also be organized with a prefix keys and if membership store 110 is queryable by prefix key using a query interface, group membership can be quickly determined that way. The heartbeat timestamp holds a timestamp that is updated by a worker to indicate that the worker process is still operating, i.e., that its host is still running and executing the worker process.

Task store 114 includes task records such as a task record 204 shown in FIG. 2. A task record might include fields for TaskID, TaskDetails, CreationTime, CompletionState, and InProcessState. The TaskID is the entity key for task store 114. The TaskID is a unique identifier for the task and TaskDetails provides the details of the task to be performed. Examples of TaskDetails might comprise an instruction and data. The instruction might be in the form of a function call, an API call, instructions in a programming language, or an indication of a selection from among predefined commands. The instruction and data might be configured as a single executable unit such that a worker process can perform the task represented by the TaskDetails field by loading the single executable unit into program memory and passing an entry point of that single executable unit to the worker host. The CompletionState field is a Boolean flag to indicate whether the task has been completed by a worker, and the InProcessState field is a Boolean flag to indicate whether the task is has been assigned to a worker process but is not yet complete. Worker processes set the CompletionState field upon completion of the task assigned, including sending any required output that results from the task and receiving receipt confirmation.

An assignment record 206, as might be found in assignment store 112, provides a LogicalGroupID, WorkerProcessID, TaskID, and Assignment Timestamp for each assignment of a task. The assignment record has a first entity key of LogicalGroupID and a second entity key of WorkerProcessID. A worker coordinator might use the first entity key to obtain a list of all of the assignments that the worker coordinator has made to its logical group and a worker might use the second entity key to obtain a list of all of the assignments that the worker coordinator is handling.

The TaskID and Assignment Timestamp fields might be used by a worker coordinator to check on a task. The worker coordinator can query assignment store 112 to obtain an assignment record for an identified task using that task's TaskID, and also query task store 114 using that TaskID to obtain a corresponding task record. The worker coordinator can then check the CompletionState and Assignment Timestamp for that task.

If the CompletionState field for a given assignment record indicates that the task has not been completed and the Assignment Timestamp is older than the current time by more than some maximum expected execution time for the task, the worker coordinator can reassign the task to another worker. Another method for signaling whether a worker is executing is to use the heartbeat timestamp field in membership store 110. Periodically, a worker will update the heartbeat timestamp field in the membership record for that worker and the worker coordinator will check that heartbeat timestamp value against a current time. If the difference is too large, the worker coordinator will proceed as if that worker has stopped executing. This can occur for a variety of reasons, such as where the worker host stops operating before the worker process has a chance to delete its own membership record. As an example, worker processes might be programmed to update their heartbeat timestamp value every five seconds and the worker coordinator will stop assigning tasks to workers with heartbeat timestamp values that differ from a current time by more than 30 seconds, and may also delete the corresponding membership record.

Lock records such as a lock record 208 might be found in lock database 126, which can be a strongly-consistent database. Lock records might have fields such as LogicalGroupID and Controlling WorkerCoordinatorID with LogicalGroupID being the entity key. Using these lock records, a process can determine how to find a controlling worker coordinator for a given logical group. For example, a worker process can query lock database 126 to determine whether there is a controlling worker coordinator for that worker process' logical group. If there is not, the worker process can instantiate one. A lock record for a logical group might also have a field for a heartbeat timestamp that is to be updated periodically by the worker coordinator that holds the lock and is therefore the controlling worker coordinator. If lock controller 124 reads the lock record and compares the heartbeat timestamp to a current time and the difference is too large, lock controller 124 can remove that controlling worker coordinator's record or reassign to another worker coordinator. For example, controlling worker coordinators might be programmed to update the heartbeat timestamp field of their lock record every 500 milliseconds and lock controller 124 might be programmed to reassign a lock on a logical group to another worker coordinator if the heartbeat timestamp field is more than four seconds behind the current time. Thus, even if the controlling worker coordinator process is abruptly stopped, such as if the worker coordinator host that is executing that worker coordinator process fails without the worker coordinator process having a chance to remove the lock, less than five seconds later, the lock controller can trigger a replacement worker coordinator process.

Figure 3:
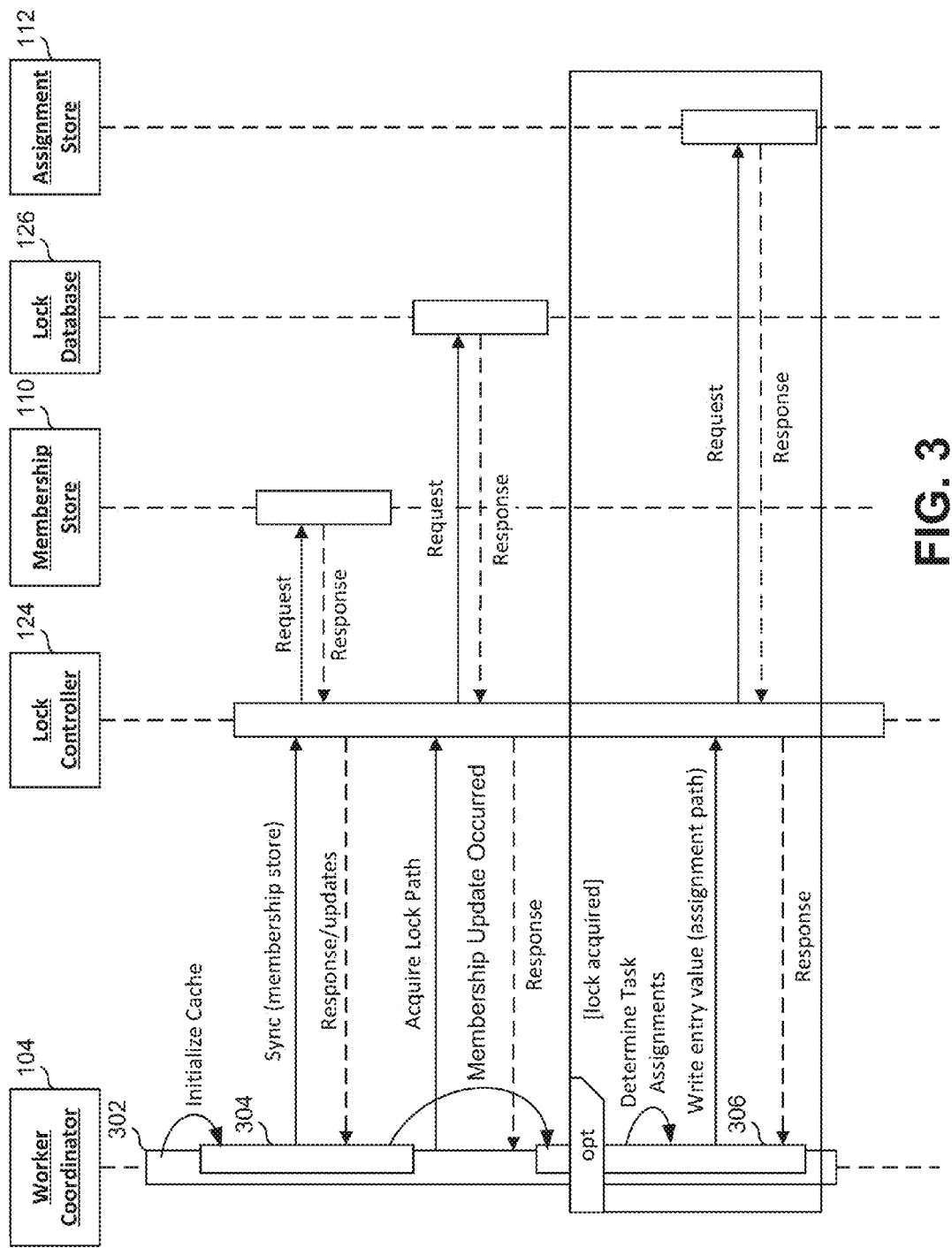
FIG. 3 is a swim diagram of various interactions of worker coordinators.

FIG. 3 is a swim diagram of various interactions of worker coordinators. The components interacting are a worker coordinator, a lock controller, a membership store, a lock database, and an assignment store. The worker coordinator uses a cache to handle group membership of the worker hosts. This can be based on monitoring the sessions established by those hosts, or by having worker hosts provide information into the membership store.

The worker coordinator handles assigning tasks to worker hosts of a logical group and there are various ways to do this. One approach is to assign tasks first to worker hosts that have the fewest tasks in process. The worker coordinator assigns a task by writing an assignment record into the assignment store where the record references the task, the assigned worker, and a timestamp of when the assignment was made. With other worker coordinators checking and attempting to acquire a lock for their logical group, if some worker coordinator fails, another will take its place. Redundancy for the worker coordinator can be handled by having multiple hosts vying for the same controlling lock in the lock database.

If a membership store controller in nonresponsive, membership might not be updated, but if the membership of the set of existing active worker hosts is not changing, then work should continue. In such cases, the worker coordinator might rely on its internal cache of membership data. If some of the active worker hosts stop being active and others become active, then the worker coordinator would have outdated information about what worker hosts there are, assuming some are active when in fact they are missing and not being aware of others that became active after the membership store controller stops responding. Once the membership store controller starts being responsive again, the worker coordinator process can obtain updated information about new worker hosts and assign tasks to those new workers.

If the lock database or lock controller is nonresponsive, associations of worker coordinator hosts and logical groups might not get updated and locks might not be able to be acquired. If there the set of existing active worker coordinator hosts is not changing, then everything should continue to work fine. If some worker coordinator hosts become nonresponsive or new ones are instantiated, then there may some unassigned tasks. If some worker processes are temporarily unreachable, a worker coordinator process might reassign those worker processes' tasks. If an unreachable worker processes later becomes reachable, there might be two processes doing the same thing. In either case, a periodic scan by the worker coordinator controller would address those issues.

Referring now specifically to the elements of FIG. 3, a worker coordinator process might maintain its own cache of the membership of the logical group that the worker coordinator process is servicing. Periodically, or based on some trigger, the worker coordinator process will sync with the membership store to get updates on membership. This can be done using a sync message and processing the response and updates.

The elements shown on the top of FIG. 3 are worker coordinator 104, lock controller 124, membership store 110, lock database 126, and assignment store 112. Some of these might be implemented as strongly-consistent files of name-value pairs. Worker coordinator 104 might execute as a main process 302 and subsidiary processes 304 and 306. When worker coordinator 104 first starts up, it initializes its local cache and passes control to subsidiary process 304 that is used to populate the local cache. Worker coordinator 104 sends a message to lock controller 124 requesting a membership list for that worker coordinator. Lock controller 124 can make a request to membership store 110 for membership records based on a query of membership store 110 and lock controller 124 checks the response to determine if there are any changes from a previous query. If there is no previous query for a worker coordinator, lock controller 124 would return the full list of member workers as a response. Otherwise, lock controller 124 can just provide updates to the membership list. This process can continue periodically. By having messages flow through lock controller 124, lock controller 124 can perform role locking to handle the case where multiple worker coordinators are running for one logical group. For example, lock controller 124 can skip replying to worker coordinator 104 if lock controller 124 is aware that there is another worker coordinator operating for the same logical group.

In the case where subsidiary process 304 does not receive a response from lock controller 124, it can attempt to acquire a lock path for the logical group. Worker coordinator does this by sending a request to lock database 126 to set the Controlling WorkerCoordinatorID for its logical group to its own identifier. The request goes through lock controller 124, which can alter the response from lock database 126 as needed. Worker coordinator 104 then invokes subsidiary process 306 to assign tasks. If worker coordinator 104 receives a response from lock controller 124 on its request for an update to the membership, then worker coordinator 104 assumes it is the controlling worker coordinator, and invokes subsidiary process 306, skipping the acquisition steps.

In subsidiary process 306, worker coordinator 104 determines task assignments and attempts to write those to assignment store 112. Lock controller 124 can enforce consistency on those writes. As described, a worker coordinator for a logical group of workers can obtain a group membership list, assign tasks, and contend for a role of a controlling worker coordinator among other worker coordinators, without requiring centralized process management. Likewise, workers can identify assigned tasks, perform those tasks, and invoke worker coordinators as needed. For example, a worker can invoke a worker coordinator by triggering a host to begin executing a worker coordinator process. Alternatively, the worker can convert to a worker coordinator.

Figure 4:
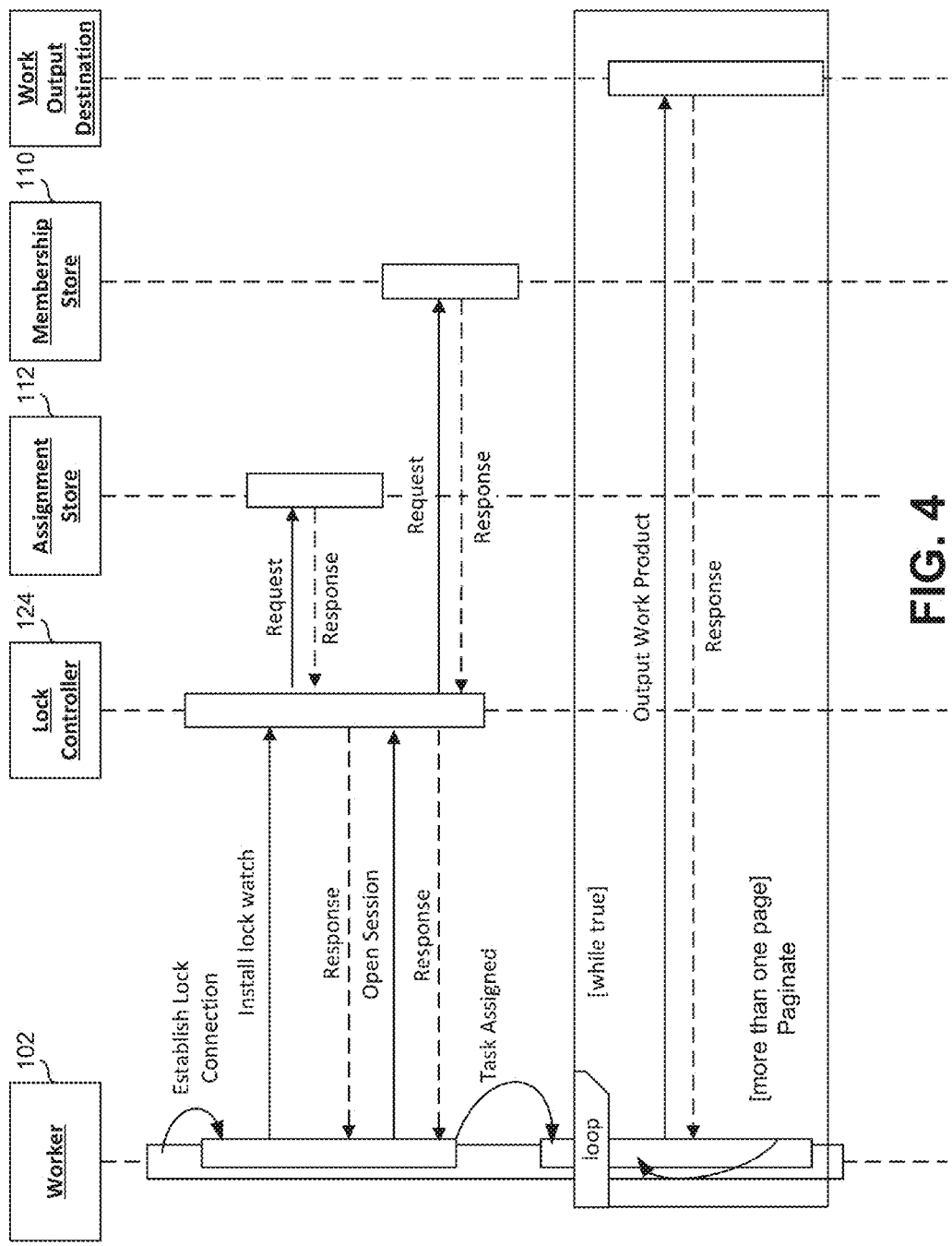
FIG. 4 is a swim diagram of various interactions for a worker process.

FIG. 4 is a swim diagram of various interactions for a worker process. Worker processes in the same logical group as the worker coordinator process can perform these operations. The elements shown in FIG. 4 interacting are worker 102, lock controller 124, assignment store 112, membership store 110, and some network or other destination, if needed, for output of the work process being performed by worker 102.

As shown, worker 102 will establish a connection to lock controller 124 and install a lock watch. The lock watch process, at lock controller 124, watches for entries in the assignments store that are assigned to worker 102. Once worker 102 is provided with the entries in response to a lock watch, worker 102 can then set the InProcessState flag of one or more entries in the assignment store. These database writes are handled by lock controller 124 to maintain consistency of assignment store 112.

Worker 102 might open a session with lock controller 124 to handle multiple such requests for assignment store reads and writes and might also use an open session to write modifications to membership store 110. For example, if the host that is hosting the worker process of worker 102 is going to stop executing the worker process, the worker host might write membership store 110, via lock controller 124, to remove a membership record for that worker. If worker 102 is assigned a task and obtains it, the worker process can loop through the task and output work product for each task as appropriate for that task.

Figure 5:
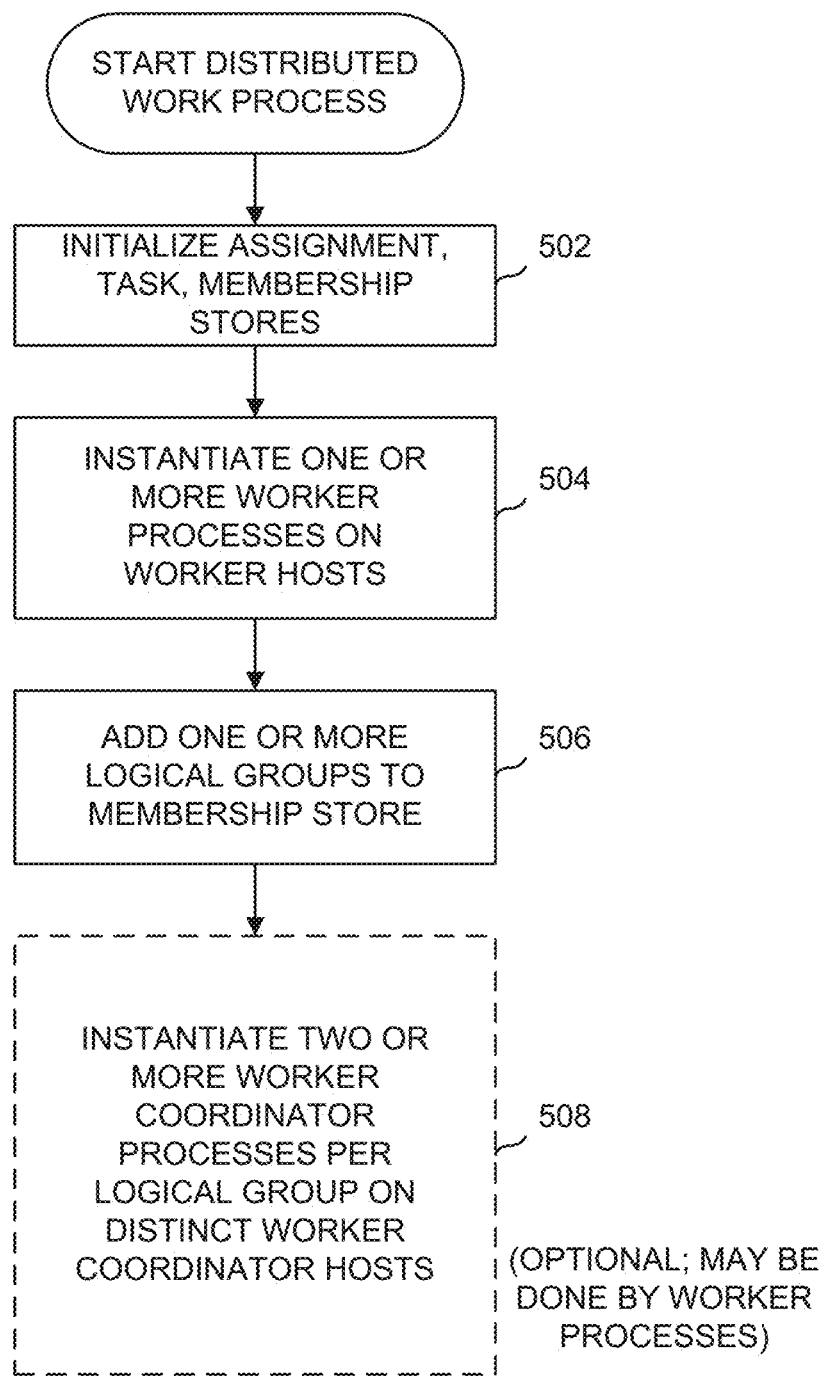
FIG. 5 is a flowchart of a process that a distributed work process might follow.

FIG. 5 is a flowchart of a process that a distributed work system might follow. Before any worker coordinators or workers are operating, the distributed work system might initialize the stores shown in FIG. 1 (step 502). For example, the distributed work system might start out with membership store 110 and assignment store 112 being empty. Task store 114 might be empty or loaded with task records from an external source.

At step 504, one or more worker processes are started on worker hosts. This might involve starting a default set of workers that would seed the distributed work system. At step 506, one or more logical groups are added to membership store 110. This might take the form of adding worker process identifiers to membership store 110. At step 508, two or more worker coordinator processes per logical group are instantiated on distinct worker coordinator hosts (for fault-tolerance). This step 508 might be optional and might be done by worker processes. The worker processes might trigger instantiation of worker coordinator processes when none are detected. Once worker coordinator hosts are instantiated, they would populate assignment store 112 with assignments.

Figure 6:
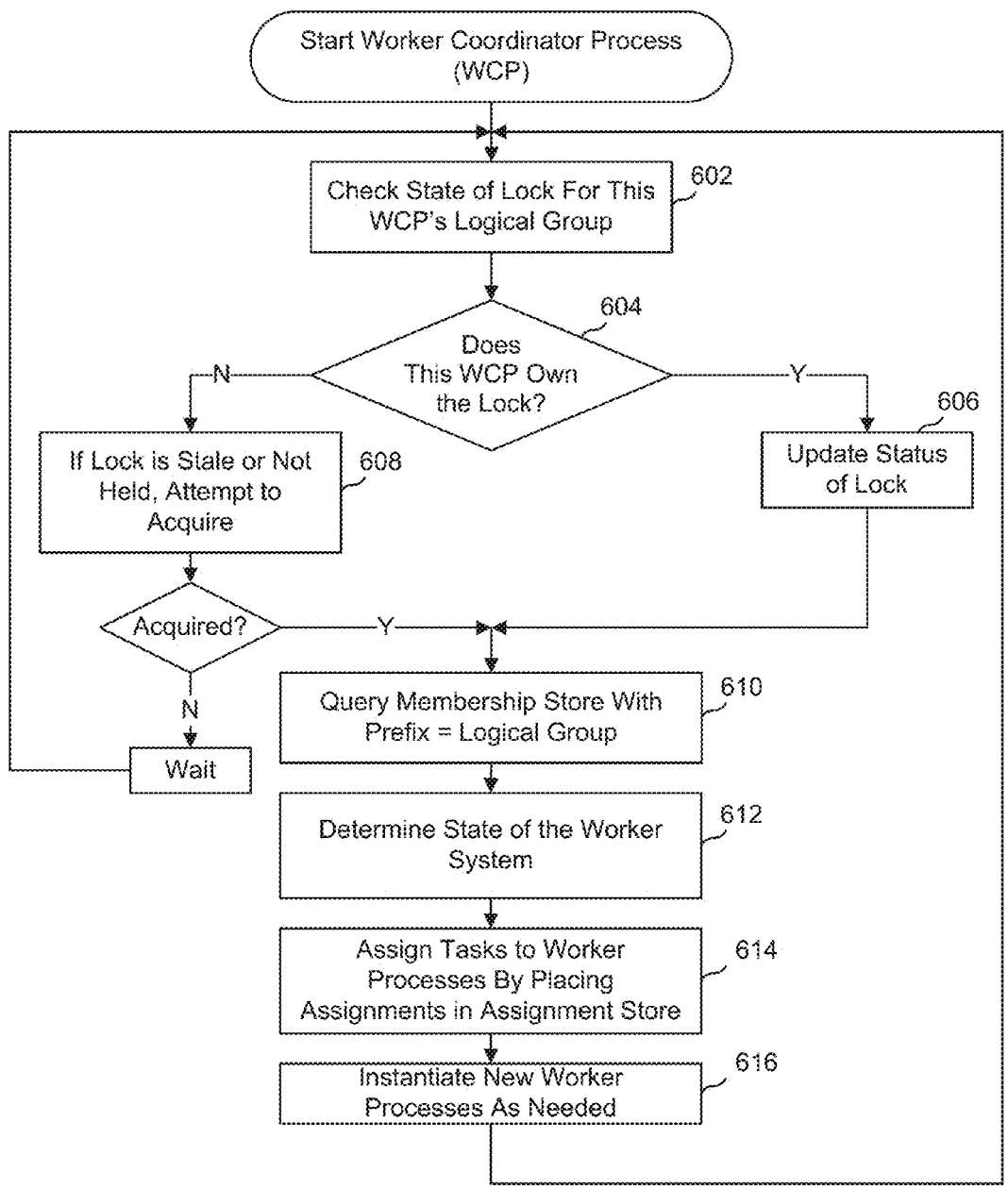
FIG. 6 is a flowchart of a process that a worker coordinator process might follow.

FIG. 6 is a flowchart of a process that a worker coordinator process operating on a worker coordinator host might follow. An example worker coordinator process is a worker coordinator 104 described with reference to FIG. 1. As illustrated in this FIG. 6, the worker coordinator process checks the state of the lock for the logical group that the worker coordinator process is associated with (step 602). This might be done by the worker coordinator host sending a request to lock controller 124. If the worker coordinator determines, at step 604, that it owns the lock, it updates lock database 126 with the status of the lock (step 606), perhaps by updating a heartbeat timestamp. If the worker coordinator determines, at step 604, that it does not own the lock, it attempts to acquire the lock (step 608). In some configurations, the worker coordinator will attempt to acquire the lock regardless of whether it is held by another worker coordinator.

A stale ownership might be determined based on a current time and the latest heartbeat timestamp. For example, the worker coordinator might be programmed with a one second threshold and if the difference between some other worker coordinator's timestamp recorded in the lock database is more than one second behind the current time, the worker coordinator will attempt to take over the controlling worker coordinator role by taking control of the lock. If the lock is not acquired, the worker coordinator can wait, update its internal data, monitor other actions, and then later check the state of the lock. By doing this, if there are multiple worker coordinators, one worker coordinator will take over for a failed worker coordinator without requiring any centralized control over the process. Acquiring the lock might involve sending a request to write a record into lock database 126 via lock controller 124. If the write is successful, then the worker coordinator would have acquired the lock for the logical group and would proceed at step 610.

At step 610, the worker coordinator queries the membership store to identify worker processes in the logical group. The worker coordinator might instead rely on its internal cache. If necessary, the worker coordinator can periodically perform a query based on the prefix that is its own identifier to find a list of available workers. At step 612, the worker coordinator will determine the state of the distributed work system, checking what tasks what workers are working on, how many workers there are for the coordinator's logical group, and possibly other state information.

The worker coordinator then assigns tasks to workers (step 614) and signals those assignments by placing them in assignments store 112. The assignments might be done based on which workers have taken on the least number of tasks, a round-robin scheme, performance metrics of the various workers, or a hybrid of some or all of these.

At step 616, the worker coordinator assesses whether there are enough worker processes to handle the tasks needed. Each worker process might track and provide the number of tasks it is handling (a worker process task count) and the maximum number of tasks it can handle. If the worker coordinator determines that there is not enough capacity (e.g., if the sum of maximum number of tasks over all worker processes is only 10% more than the sum of the currently handled number of tasks over all worker processes, or some other test), the worker coordinator can trigger the instantiation of other worker processes. Other capacity detection subprocesses might be used instead. For example, the worker coordinator might wait until all worker processes are occupied before instantiating another worker process. The worker coordinator might also signal an alarm in such cases.

In some cases, where a worker process fails, there might be tasks that were assigned but are not being worked on by any worker process. Where a worker coordinator fails, there might be tasks that get assigned again to another worker. To correct for these situations, a worker coordinator might run another process, perhaps asynchronously, to scan the task store and/or the assignment store for missing assignments and duplicates and update the assignments store accordingly. This mechanism serves as a self-healing process for balancing the need for all tasks to be handled and tasks to be spread out as possible.

Figure 7:
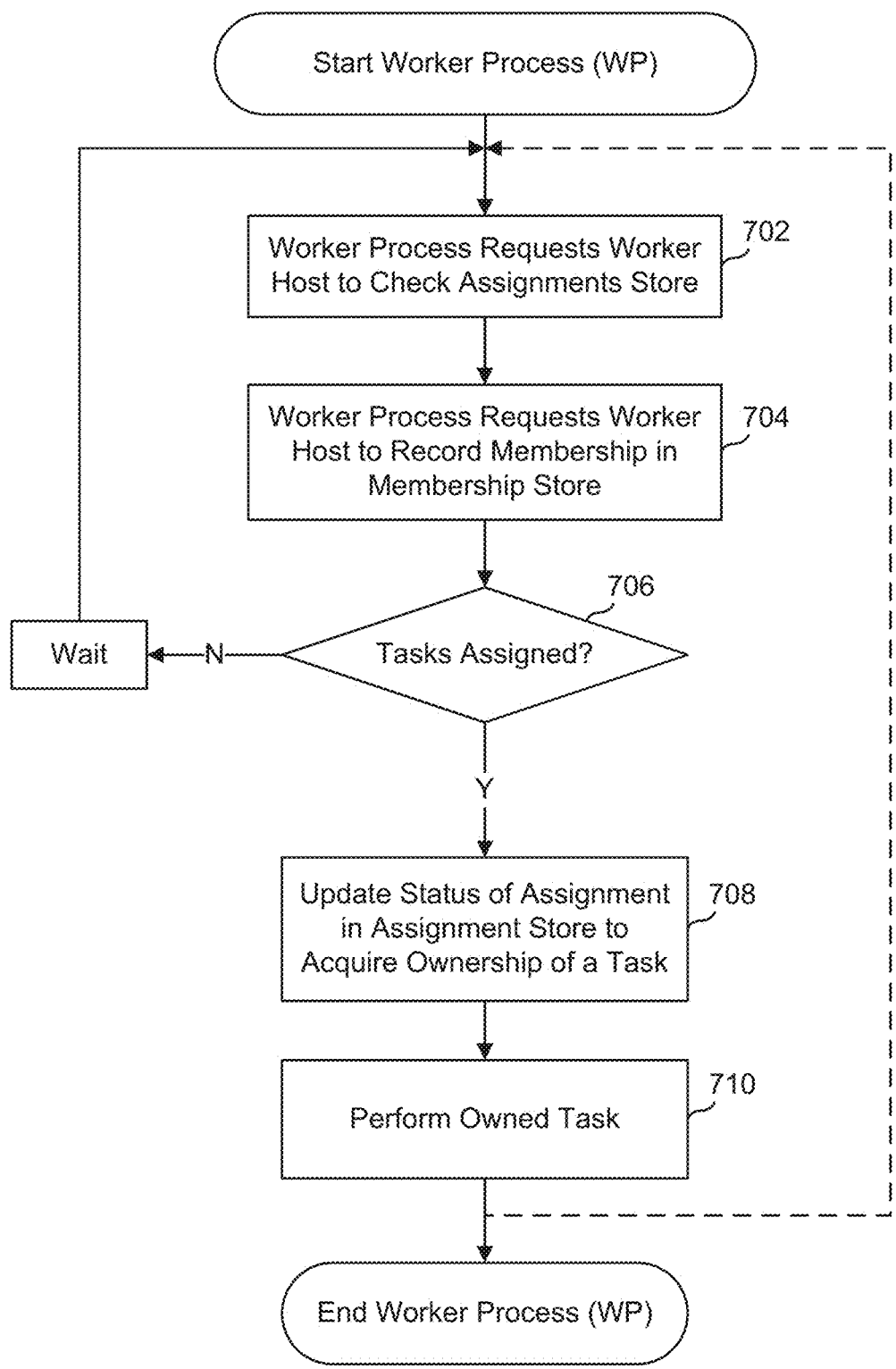
FIG. 7 is a flowchart of a process that a worker process might follow.

FIG. 7 is a flowchart of a process that a worker process 102 might follow. As illustrated there, when worker process 102 starts up, it makes a request of the worker host that is hosting the worker process (step 702). The request is to check of assignment store 112 for assignments associated with worker process 102. Worker process 102 might have lock controller 124 handle any updates to assignment store 112 so that assignment store 112 remains consistent.

Next, worker process 102 records its membership in a logical group by updating membership store 110, which can be done via lock controller 124. Preferably, step 704 is performed following step 702 to avoid the situation where worker process 102 might miss assignments. If there are tasks waiting, at step 706, the process flows to step 708, updates status of an assignment in assignment store 112 via lock controller 124, indicating that the assignment has been taken on, and then at step 710, performs the task.

For long-lived tasks, worker process 102 might exist for just one task, then be terminated at its worker host. In some instances, worker process 102 might continue back at step 702 to check for additional assignments.

Figure 8:
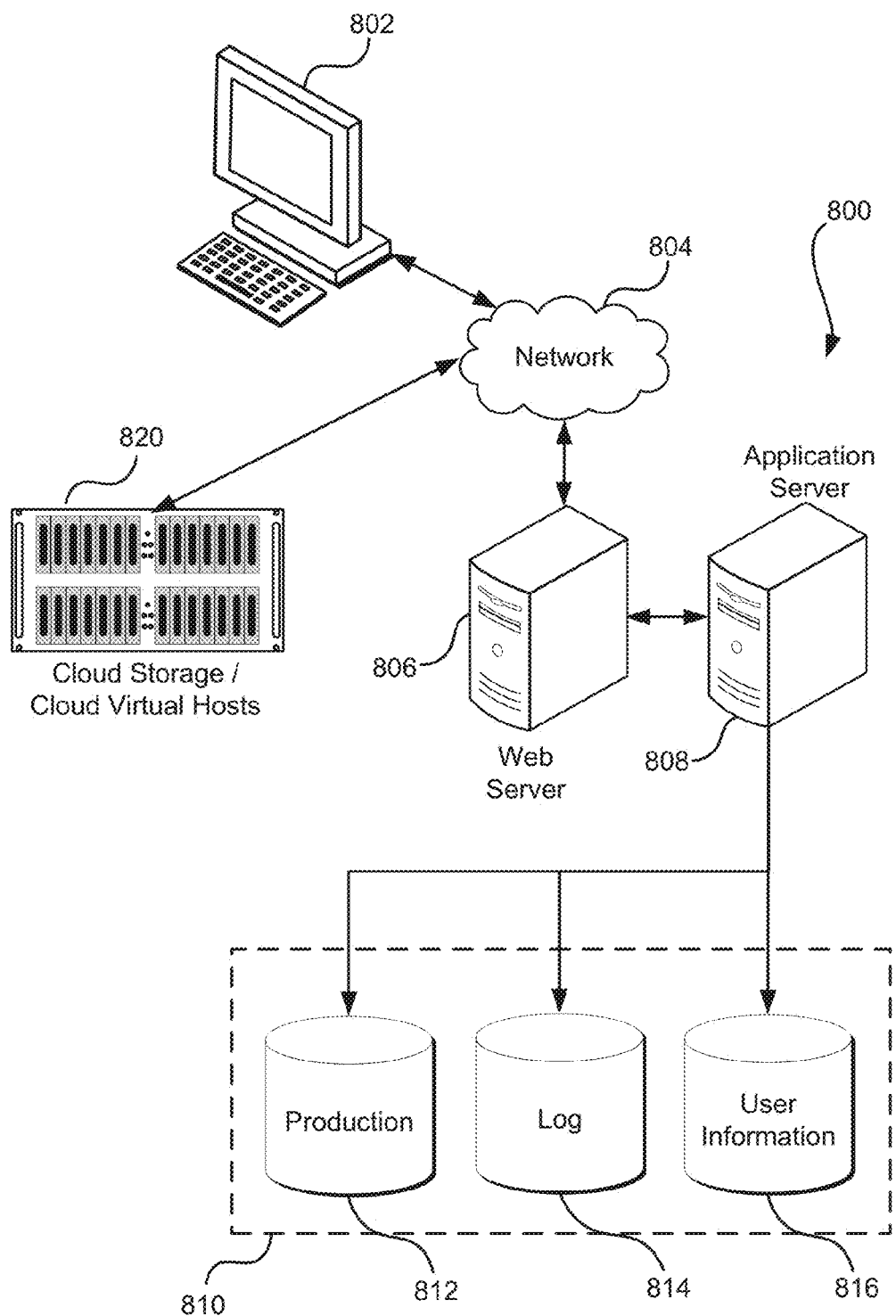
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808, a data store 810, and cloud storage and virtual hosts 820. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

Figure 9:
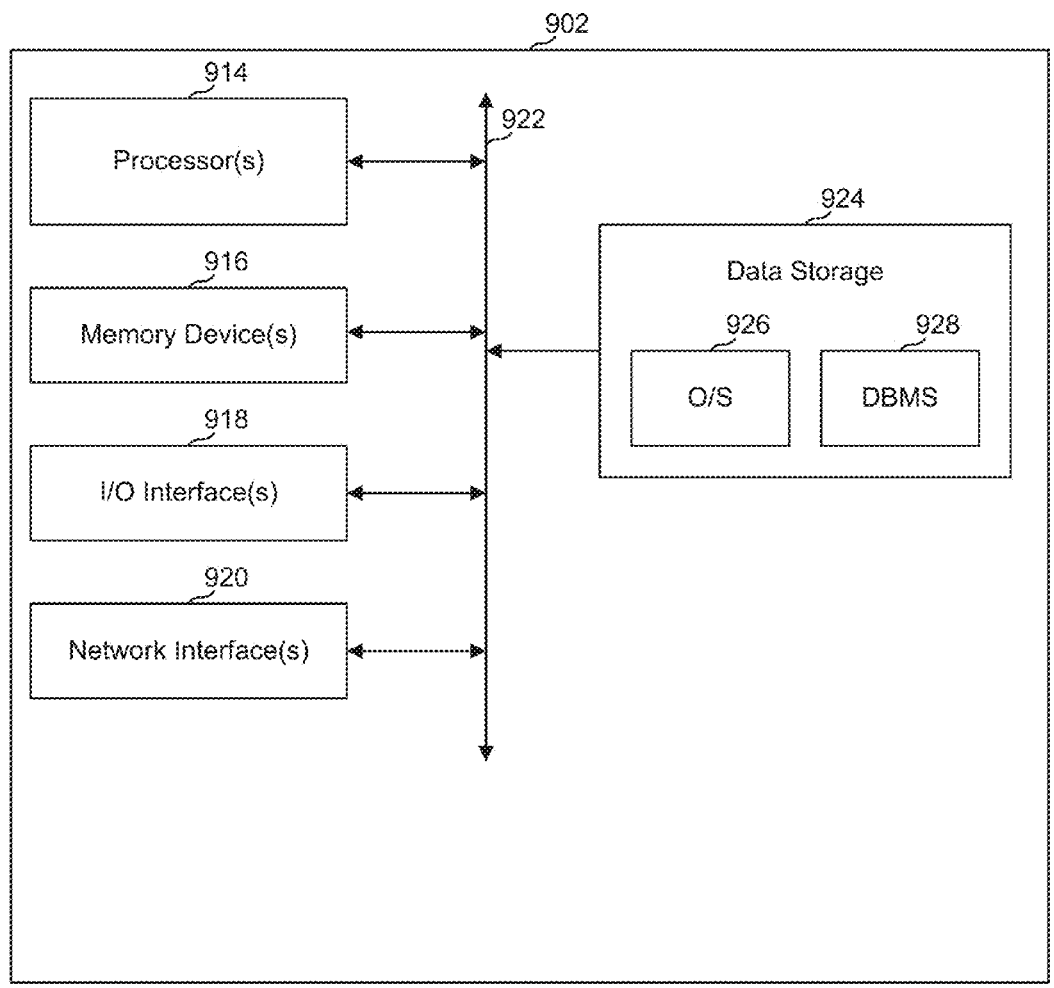
FIG. 9 is a schematic block diagram of a host that might be a component of a distributed work processing system.

FIG. 9 is a schematic block diagram of a host 902 that might be a component of distributed host hardware 106 shown in FIG. 1. Host 902 can be used as a worker host that executes, stores, and supports a worker process or as a worker coordinator host that executes, stores, and supports a worker coordinator process. In general, host 902 can execute one or more computer processes.

Host 902 may include one or more processors (processor(s)) 914, one or more memory devices 916 (generically referred to herein as memory 916), one or more input/output ("I/O") interface(s) 918, one or more network interfaces 920, and data storage 924. Host 902 may further include one or more buses 922 that functionally couple various components of host 902. Bus(es) 922 may include at least one of a system bus, a memory bus, an address bus, or a message bus, and may permit exchange of information (e.g., data (including computer-executable code), signaling, etc.) between various components of host 902.

Memory 916 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

Data storage 924 may include removable storage and/or non-removable storage including, but not limited to, magnetic storage, optical disk storage, and/or tape storage. Data storage 924 may provide non-volatile storage of computer-executable instructions and other data. Data storage 924 may store computer-executable code, instructions, or the like that may be loadable into memory 916 and executable by processor(s) 914 to cause processor(s) 914 to perform or initiate various operations. Data storage 924 may additionally store data that may be copied to memory 916 for use by processor(s) 914 during the execution of the computer-executable instructions. Moreover, output data generated as a result of execution of the computer-executable instructions by processor(s) 914 may be stored initially in memory 916, and may ultimately be copied to data storage 922 for non-volatile storage. Examples of data that might be stored in memory 916 or data storage 924 include local caches of data store information for data externally stored.

Data storage 924 may store one or more operating systems (O/S) 926; one or more database management systems (DBMS) 928; and one or more program modules, applications, or the like. Any of the program modules may include one or more sub-modules. Any of the modules depicted in FIG. 9 may include computer-executable code, instructions, or the like that may be loaded into memory 916 for execution by one or more of processor(s) 914.

Processor(s) 914 may be configured to access memory 916 and execute a computer process represented by computer-executable instructions loaded therein. For example, processor(s) 914 may be configured to execute computer-executable instructions of the various program modules of host 902 to cause or facilitate various operations to be performed. A computer process represented by computer-executable instructions might be a computer program, a module, an executable file, or the like. An example of a host is a network-connected computer on which the computer process is executed. That host might have other software running on it, such as an operating system and application programs. One such application program might be a worker process or a worker coordinator process.

One or more input/output (I/O) interfaces 918 may be provided that may facilitate the receipt of input information by host 902 from one or more I/O devices as well as the output of information from host 902 to the one or more I/O devices. The I/O devices may include, for example, one or more user interface devices that facilitate interaction between a user and host 902 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

Host 902 may further include one or more network interfaces 920 via which host 902 may communicate with any of a variety of other systems, platforms, networks, devices, and so forth. Such communication may occur via any of one or more of network(s) 912.

It should be appreciated that the program modules, applications, computer-executable instructions, code, or the like depicted in FIG. 9 as being stored in data storage 924 and data storage 946 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on host 902. Further, functionality may be modularized differently such that processing described as being supported collectively by the collection of program modules depicted in FIG. 9 may be performed by a fewer or greater number of modules, or functionality described as being supported by any particular module may be supported, at least in part, by another module. In addition, any of the functionality described as being supported by any of the program modules depicted in FIG. 9 may be implemented, at least partially, in hardware and/or firmware across any number of devices.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory computer-readable storage medium.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for managing distributed work processing, comprising:
under control of one or more computer systems configured with executable instructions,
storing records of a collection of tasks to be performed as part of the distributed work processing, the records being stored in a first data store;
executing a worker as a computer process on a worker host, wherein the worker host is a computer system that executes program code;
executing a first worker coordinator on a first worker coordinator host of a plurality of worker coordinator hosts, wherein the first worker coordinator host is a computer system that executes program code and wherein executing the first worker coordinator includes requesting a lock record for a logical group, the logical group corresponding to a group of workers that are to perform the collection of tasks;

executing a second worker coordinator on a second worker coordinator host of the plurality of worker coordinator hosts, wherein the second worker coordinator host is a computer system that executes program code, wherein executing the second worker coordinator includes requesting the lock record for the logical group, and wherein the second worker coordinator host is independent of the first worker coordinator host;

indicating, in the lock record, which of the first worker coordinator or the second worker coordinator is granted the lock record to be a controlling worker coordinator;

maintaining a second data store for storing a membership list of worker hosts that are in the logical group;

reading, using the controlling worker coordinator, the first data store and the second data store;

performing task assignment of the collection of tasks among the group of workers of the logical group;

determining, using one or more of the workers of the group of workers of the logical group, that a worker coordinator is not active for the logical group; and invoking a worker coordinator using one of the one or more worker of the group of workers of the logical group that determined that no worker coordinator is active for the logical group.

2. The computer-implemented method of claim 1, further comprising:

detecting task capacity over the workers of the logical group that are executing on worker hosts; and adding additional workers to the logical group.

3. The computer-implemented method of claim 1, wherein the second data store is a data store that includes a query interface for prefix searches and wherein a key associated with the logical group is included as a prefix key for records in the second data store.

4. A work processing system for processing computational tasks, comprising:

a worker host that is a computer system configured to execute program code that is hosted by the worker host, the computer system comprising at least a program code memory in which the program code that is hosted is stored and a processor that can execute instructions read from the program code memory, a worker process stored by the worker host;

a first worker coordinator host that can execute program code that is hosted by the first worker coordinator host;

a first worker coordinator process executing on the first worker coordinator host;

a second worker coordinator host that can execute program code that is hosted by the second worker coordinator host and is distinct from the first worker coordinator host;

a second worker coordinator process executing on the second worker coordinator host;

a lock record containing a reference to a controlling worker coordinator, wherein the controlling worker coordinator is one of the first worker coordinator process and the second worker coordinator process;

a first data store storing a collection of tasks to be performed by a logical group of workers;

a second data store storing the lock record for the logical group, the second data store being readable by the first worker coordinator host and the second worker coordinator host;

a third data store storing a membership list of worker hosts of the logical group;

a scanner process, running as part of the controlling worker coordinator, that reads the first data store and the third data store to perform task assignment of the collection of tasks among worker processes hosted on worker hosts of the logical group;

a first lock contention process that runs on the first worker coordinator host and contends for a role of the controlling worker coordinator, contention being between the first worker coordinator host and other worker coordinator hosts; and a second contention process that runs on the second worker coordinator host and contends for a role of the controlling worker coordinator, contention being between the second worker coordinator host and other worker coordinator hosts.

5. The work processing system of claim 4, further comprising:

program code for tracking task capacity over the worker processes hosted on the worker hosts of the logical group; and program code for adding additional worker hosts to the logical group.

6. The work processing system of claim 4, further comprising:

program code for assigning prefix keys to records of the third data store, wherein a key associated with the logical group is included as a prefix key for records in the third data store; and program code for querying the third data store for membership of a logical group.

7. The work processing system of claim 4, further comprising:

program code for determining, using the worker process, whether at least one worker coordinator is active for a logical group of which the worker process is a member; and program code for triggering, using the worker process, instantiation of a new worker coordinator process.

8. The work processing system of claim 4, further comprising:

program code for determining, using the worker process, whether at least one worker coordinator is active; and program code for configuring the worker process into an instantiation of a new worker coordinator process.

9. The work processing system of claim 4, further comprising:

program code for determining performance metrics, using the controlling worker coordinator, for worker processes in the logical group; and program code for assigning tasks from the collection of tasks to worker processes based on performance metrics of those worker processes.

10. The work processing system of claim 4, further comprising:

program code for upon allocation of a given task to a given worker process, storing a record of that allocation to a fourth data store; and program code for accessing the fourth data store with a querying worker process to obtain a task to be performed by that querying worker process.

11. The work processing system of claim 4, further comprising:
    program code for storing, for the worker process, a maximum number of tasks for the worker process; and
    program code for signaling to the controlling worker coordinator, from the worker process, the maximum number of tasks for the worker process and a number of tasks currently being handled by the worker process.

12. The work processing system of claim 11, further comprising:
    program code for detecting whether worker process task counts are greater than a threshold; and
    program code for launching additional worker processes upon detecting that the worker process task counts are greater than the threshold.

13. A computer-implemented method for managing distributed work processing, comprising:
    uniquely identifying a first worker host to host a first worker process;
    uniquely identifying the first worker process;
    joining the first worker process to a logical group, the logical group corresponding to a group of worker processes that are to perform a collection of tasks as part of distributed work processing;
    reading an assignment store to identify tasks assigned to the first worker process;
    determining if a controlling worker coordinator is present; and
    instantiating a worker coordinator;
    contending for a lock record of the logical group, contention being between contending worker coordinator hosts, wherein a successful contention results in one of the contending worker coordinator hosts being a controlling worker coordinator host that hosts the controlling worker coordinator;
    reading a membership store to determine the worker process that are in the logical group;
    scanning a task store to identify tasks to be assigned to worker processes;
    allocating tasks of the collection of tasks among worker processes represented in the membership store for the logical group;
    writing task assignments to the assignment store; and
    detecting duplicate assignments.

14. The method of claim 13, further comprising:
    tracking task capacity over the worker processes executing on worker hosts that are in the logical group; and
    adding additional worker hosts to the logical group.

15. The method of claim 13, further comprising:
    assigning prefix keys to records of the membership store, wherein a key associated with the logical group is included as a prefix key for records in the membership store; and
    querying the membership store for membership of a logical group.

16. The method of claim 13, further comprising:
    determining whether at least one worker coordinator is active; and
    triggering instantiation of a new worker coordinator process.

17. The method of claim 13, further comprising:
    determining whether at least one worker coordinator is active; and
    configuring the first worker process as an instantiation of a new worker coordinator process.

18. The method of claim 13, further comprising:
    determining performance metrics for worker processes in the logical group; and
    assigning tasks from the collection of tasks to worker processes based on performance metrics of those worker processes.

19. The method of claim 13, further comprising:
    storing a record of an allocation of a given task to a given worker process, stored into a third data store; and
    wherein executable instructions for the first worker process comprise instructions for accessing the third data store with a querying process to obtain a task to be performed by the first worker process.

20. The method of claim 13, further comprising:
    signaling to the controlling worker coordinator a maximum number of tasks for the first worker process and a number of tasks currently being handled by the first worker process; and
    detecting whether first worker process task counts are greater than a threshold; and
    launching additional worker processes upon detecting that the first worker process task counts are greater than the threshold.

* * * * *